US012793173B2

(12) United States Patent
Chen et al.

(10) Patent No.: US 12,793,173 B2
(45) Date of Patent: Nov. 10, 2026

(54) IMAGE RESOLUTION ADJUSTMENT METHOD AND ELECTRONIC DEVICE

(71) Applicant: Acer Incorporated, New Taipei City (TW)

(72) Inventors: Kuan-Ju Chen, New Taipei City (TW); Liang-Chi Chen, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 275 days.

(21) Appl. No.: 18/585,086

(22) Filed: Feb. 23, 2024

(65) Prior Publication Data

US 2025/0217928 A1 Jul. 3, 2025

(30) Foreign Application Priority Data

Dec. 29, 2023 (TW) ................................ 112151708

(51) Int. Cl.
*G06T 3/4053* (2024.01)
*G06F 3/14* (2006.01)

(52) U.S. Cl.
CPC .............. *G06T 3/4053* (2013.01); *G06F 3/14* (2013.01)

(58) Field of Classification Search
CPC ................................ G06T 3/4053; G06F 3/14
See application file for complete search history.

(56) References Cited

U.S. PATENT DOCUMENTS 9,600,416 B2 * 3/2017 Ramanujan ......... G06F 12/0811
2019/0243763 A1 * 8/2019 Birke .................. G06F 12/0873
2021/0209032 A1 * 7/2021 Coats .................... G06F 12/128
2022/0189531 A1 * 6/2022 Yudanov .......... H03K 19/01742
(Continued)

FOREIGN PATENT DOCUMENTS

CN 101388110 A * 3/2009
CN 106155936 A * 11/2016
(Continued)

OTHER PUBLICATIONS

H. Takahashi, H. F. Ahmad and K. Mori, "Layered Memory Architecture for High IO Intensive Information Services to Achieve Timeliness," 2008 11th IEEE High Assurance Systems Engineering Symposium, Nanjing, China, 2008, pp. 343-349, doi: 10.1109/HASE.2008.42. (Year: 2008).*
(Continued)

*Primary Examiner* — Michael Robert Cammarata
(74) *Attorney, Agent, or Firm* — JCIPRNET

(57) ABSTRACT

An image resolution adjustment method and an electronic device are disclosed. In the method, a target application is executed to obtain a target image with a first resolution based on a first frame rate. During an execution of the target application, a target memory is selected from a plurality of buffer memories according to a usage rate of each of the buffer memories. An image processing model and the target memory are processed to adjust a resolution of the target image from the first resolution to a second resolution. The second resolution is higher than the first resolution. A display interface is controlled to present the target image with the second resolution based on the first frame rate. Accordingly, an image with a high resolution may be presented based on a higher frame.

10 Claims, 3 Drawing Sheets

(56) References Cited

U.S. PATENT DOCUMENTS

| | | | | |
|---|---|---|---|---|
| 2025/0217928 | A1* | 7/2025 | Chen | G06T 3/4053 |
| 2025/0336033 | A1* | 10/2025 | Istrin | G06T 3/4046 |
| 2026/0017197 | A1* | 1/2026 | Lin | G06F 12/0802 |

FOREIGN PATENT DOCUMENTS

| | | | | | |
|---|---|---|---|---|---|
| CN | 111587447 | | | 9/2021 | |
| CN | 114442927 | | | 5/2022 | |
| CN | 120390157 | A | * | 7/2025 | H04N 7/0127 |
| TW | 200511817 | | | 3/2005 | |
| TW | I519154 | | | 1/2016 | |
| TW | 202105028 | | | 2/2021 | |
| TW | I826213 | B | * | 12/2023 | H04N 21/4402 |
| WO | WO-2019135621 | A1 | * | 7/2019 | G06N 3/045 |
| WO | WO-2021189203 | A1 | * | 9/2021 | G06F 12/0873 |

OTHER PUBLICATIONS

Y. Liang, T. Mitra and L. Ju, “Instruction Cache Locking Using Temporal Reuse Profile,” in IEEE Transactions on Computer-Aided Design of Integrated Circuits and Systems, vol. 34, No. 9, pp. 1387-1400, Sep. 2015. (Year: 2015).*

H. Sun, Q. Cui, J. Huang and X. Qin, “NCache: A Machine-Learning Cache Management Scheme for Computational SSDs,” in IEEE Transactions on Computer-Aided Design of Integrated Circuits and Systems, vol. 42, No. 6, pp. 1810-1823, Jun. 2023, doi: 10.1109/TCAD.2022.3208769. (Year: 2023).*

J. Robinson and M. Devarakonda, “Data Cache Management Using Frequency-Based Replacement,” in Proc. ACM Sigmetrics Conf. Measurement and Modeling of Computer Systems, 1990. (Year: 1990).*

K. Pandya, D. Varshney, A. Aggarwal and A. Singh Parihar, “An Analytical Study of CNN-based Video Frame Interpolation Techniques,” 2020 4th International Conference on Intelligent Computing and Control Systems (ICICCS), Madurai, India, 2020, pp. 1124-1131, doi: 10.1109/ICICCS48265.2020.9120989. (Year: 2020).*

H. Bahn, “Efficiency of Buffer Caching in Computing-Intensive Workloads,” 2020 7th International Conference on Information Science and Control Engineering (ICISCE), Changsha, China, 2020, pp. 548-552, doi: 10.1109/ICISCE50968.2020.00120. (Year: 2020).*

R. Likamwa, J. Hu, V. Kodukula and Y. Liu, “Adaptive Resolution-Based Tradeoffs for Energy-Efficient Visual Computing Systems,” in IEEE Pervasive Computing, vol. 20, No. 2, pp. 18-26, Apr. 1-Jun. 2021, doi: 10.1109/MPRV.2021.3052528. (Year: 2021).*

Tovar, N.; Kwon, S.; Jeong, J. Image Upscaling with Deep Machine Learning for Energy-Efficient Data Communications. Electronics 2023, 12, 689. https://doi.org/10.3390/electronics12030689 (Year: 2023).*

Hashemi, Milad, et al. “Learning memory access patterns.” International Conference on Machine Learning. PMLR, 2018. (Year: 2018).*

Yi, Rongjie, et al. “Edgemoe: Fast on-device inference of moe-based large language models.” arXiv preprint arXiv:2308.14352 (2023). (Year: 2023).*

J. Jeong, H. Kim and J. Lee, “Transparently Exploiting Device-Reserved Memory for Application Performance in Mobile Systems,” in IEEE Transactions on Mobile Computing, vol. 15, No. 11, pp. 2878-2891, Nov. 1, 2016, doi: 10.1109/TMC2015.2504934. (Year: 2016).*

S. Park, M. Kim and H. Y. Yeom, “GCMA: Guaranteed Contiguous Memory Allocator,” in IEEE Transactions on Computers, vol. 68, No. 3, pp. 390-401, Mar. 1, 2019, doi: 10.1109/TC2018.2869169. (Year: 2019).*

T. Misu, Y. Matsuo, S. Iwamura and S. Sakaida, “Real-time video coding system for up to 4K 120P videos with spatio-temporal format conversion,” 2015 IEEE International Conference on Consumer Electronics (ICCE), Las Vegas, NV USA, 2015, pp. 52-55, doi: 10.1109/ICCE.2015.7066315 (Year: 2016).*

D. Cho, et al., “Adaptive Scratch Pad Memory Management for Dynamic Behavior of Multimedia Applications,” in IEEE Transactions on Computer-Aided Design of Integrated Circuits and Systems, vol. 28, No. 4, pp. 554-567, Apr. 2009, doi: 10.1109/TCAD.2009.2014002. (Year: 2009).*

A. M. Abdelkhalek and T. S. Abdelrahman, “Locality management using multiple SPMs on the Multi-Level Computing Architecture,” 2006 IEEE/ACM/IFIP Workshop on Embedded Systems for Real Time Multimedia, Seoul, Korea (South), 2006, pp. 67-72, doi: 10.1109/ESTMED.2006.321276. (Year: 2006).*

F. Angiolini, L. Benini and A. Caprara, “An efficient profile-based algorithm for scratchpad memory partitioning,” in IEEE Transactions on Computer-Aided Design of Integrated Circuits and Systems, vol. 24, No. 11, pp. 1660-1676, Nov. 2005, doi: 10.1109/TCAD.2005.852299. (Year: 2005).*

Z. Xu, F. Yu, Z. Qin, C. Liu and X. Chen, “DiReCtX: Dynamic Resource-Aware CNN Reconfiguration Framework for Real-Time Mobile Applications,” in IEEE Transactions on Computer-Aided Design of Integrated Circuits and Systems, vol. 40, No. 2, pp. 246-259, Feb. 2021, doi: 10.1109/TCAD.2020.2995813. (Year: 2021).*

P. Vogel, A. Marongiu and L. Benini, “Lightweight Virtual Memory Support for Zero-Copy Sharing of Pointer-Rich Data Structures in Heterogeneous Embedded SoCs,” in IEEE Transactions on Parallel and Distributed Systems, vol. 28, No. 7, pp. 1947-1959, Jul. 1, 2017, doi: 10.1109/TPDS.2016.2645219. (Year: 2017).*

P. Nittur, A. Kanukotla and N. Mutyala, “Temporal Based Intelligent LRU Cache Construction,” 2020 IEEE 27th International Conference on High Performance Computing, Data, and Analytics (HiPC), Pune, India, 2020, pp. 315-322, doi: 10.1109/HiPC50609.2020.00045. (Year: 2020).*

Zhang, Junzhe, et al. “Efficient memory management for gpu-based deep learning systems.” arXiv preprint arXiv: 1903.06631 (2019). (Year: 2019).*

Peng Z, Du J, Qiao Y. Design of GPU Network-on-Chip for Real-Time Video Super-Resolution Reconstruction. Micromachines (Basel). May 16, 2023;14(5):1055. doi: 10.3390/mi14051055. PMID: 37241678; PMCID: PMC10223162. (Year: 2023).*

* cited by examiner

IMAGE RESOLUTION ADJUSTMENT METHOD AND ELECTRONIC DEVICE

CROSS-REFERENCE TO RELATED APPLICATION

This application claims the priority benefit of Taiwan application serial no. 112151708, filed on Dec. 29, 2023. The entirety of the above-mentioned patent application is hereby incorporated by reference herein and made a part of this specification.

BACKGROUND

Technical Field

The disclosure relates to an image resolution adjustment method and an electronic device.

Description of Related Art

The resolutions and the frame rates of image capturing that can be supported by the camera modules of most smartphones, tablets, or laptops have gradually increased with the advancement of technology. However, for most camera modules, if the resolution of the captured image is increased, the frame rate of the captured image will be inevitably decreased accordingly. On the contrary, if the frame rate of the captured image is increased, the resolution of the captured image will be inevitably decreased accordingly. Therefore, in a situation that a slow motion photographing mode supported by some types of camera modules is switched, since the frame rate of the captured image is increased, the resolution of the captured image will also be correspondingly decreased. Later, when viewing the image previously captured through the slow motion photographing mode on a larger screen, the user will notice a significant decrease in image quality.

SUMMARY

The disclosure provides an image resolution adjustment method and an electronic device, which can improve the aforementioned problems.

An embodiment of the disclosure provides an image resolution adjustment method which includes: executing a target application to obtain a target image with a first resolution based on a first frame rate; during an execution of the target application, selecting a target memory from multiple buffer memories according to a usage rate of each of the buffer memories; processing the target image by an image processing model and the target memory to adjust a resolution of the target image from the first resolution to a second resolution, where the second resolution is higher than the first resolution; and controlling a display interface to present the target image with the second resolution based on the first frame rate.

An embodiment of the disclosure further provides an electronic device which includes an image capturing interface, a display interface, multiple buffer memories, and a processor. The processor is coupled to the image capturing interface, the display interface, and the buffer memories. The processor is configured to: execute a target application to instruct the image capturing interface to obtain the target image with a first resolution based on a first frame rate; select a target memory from the buffer memories according to a usage rate of each of the buffer memories during an execution of the target application; process the target image by an image processing model and the target memory to adjust a resolution of the target image from the first resolution to a second resolution, where the second resolution is higher than the first resolution; and control the display interface to present the target image with the second resolution based on the first frame rate.

Based on the above, the target image with the first resolution may be obtained by executing the target application based on the first frame rate. On the other hand, during the execution of the target application, the target memory may be selected from the buffer memories according to the usage rate of each of the buffer memories. The target image may be processed by the image processing model and the target memory to increase the resolution of the target image from the first resolution to the second resolution. Thereafter, the display interface may be controlled to present the target image with the second resolution based on the first frame rate. In this way, in a premise that the image processing performance of the image processing model may be improved as much as possible, the requirement of the user for photographing and presenting the image with a high resolution based on a higher frame rate may be met.

DESCRIPTION OF THE EMBODIMENTS

Figure 1:
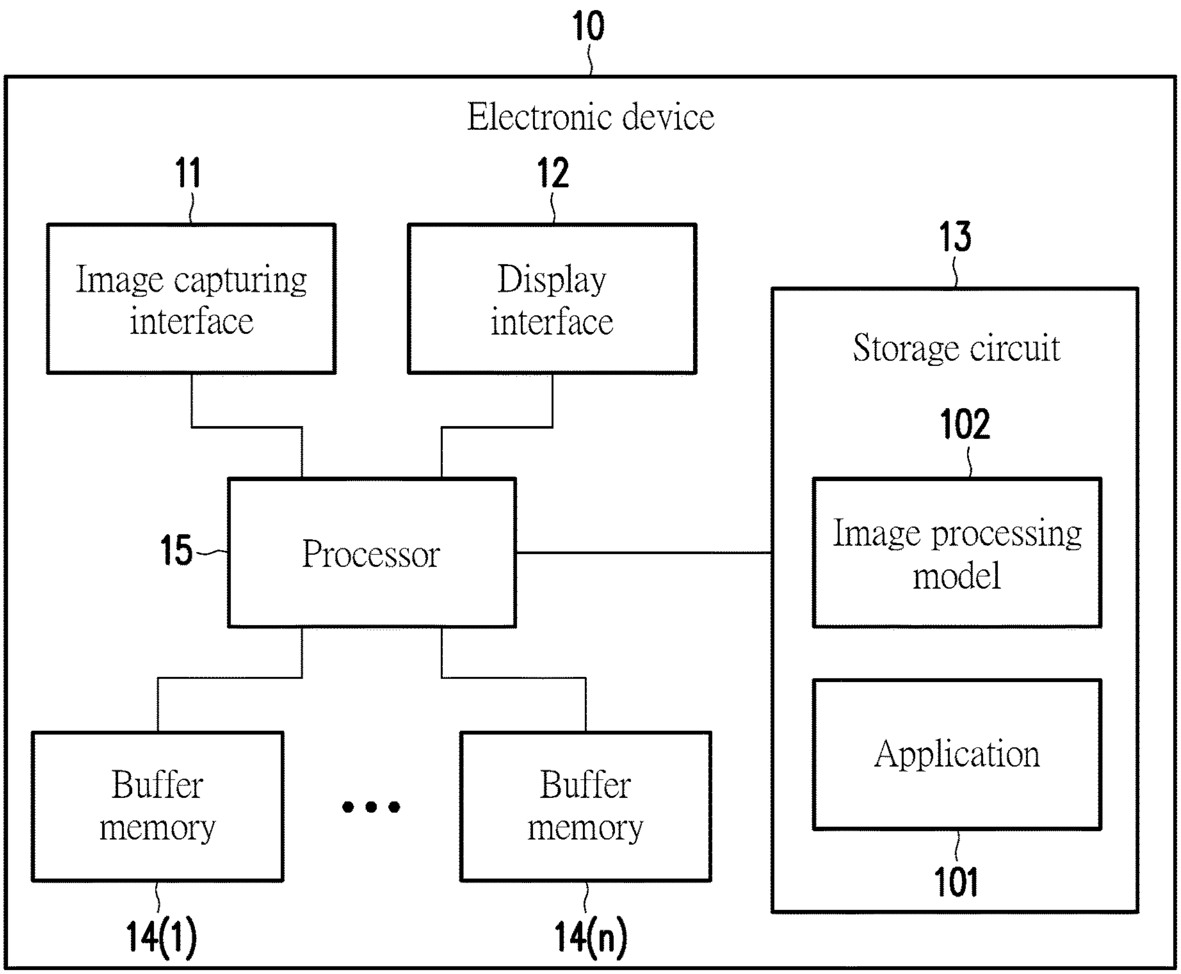
FIG. 1 is a schematic diagram of an electronic device according to an embodiment of the disclosure.

FIG. 1 is a schematic diagram of an electronic device according to an embodiment of the disclosure. Referring to FIG. 1, an electronic device 10 may be an electronic device supporting functions of image capturing and image processing, such as a smart phone, a tablet computer, a notebook computer, a desktop computer, a game console, or a server, and a type of the electronic device 10 is not limited thereto.

The electronic device 10 includes an image capturing interface 11, a display interface 12, a storage circuit 13, buffer memories 14(1)~14(*n*), and a processor 15. The image capturing interface 11 is configured to capture an external image. For example, the image capturing interface 11 may include an image capturing module. This image capturing module includes at least a lens and a photosensitive element. This image capturing module (including the lens and the photosensitive element) may be configured to photograph the external image and generate corresponding image data.

The display interface 12 is configured to display an image. For example, the display interface 12 may include a plasma display, a liquid-crystal display (LCD), a thin film transistor liquid crystal display (TFT-LCD), an organic light-emitting diode (OLED), and a light-emitting diode display (LED display), and a type of the display interface 12 is not limited thereto.

The storage circuit 13 is configured to store data. For example, the storage circuit 13 may include a read only memory (ROM), a solid state disk (SSD), a conventional hard disk drive (HDD), a flash memory module, an embedded multimedia card (eMMC), a universal flash storage (UFS) device, or other types of non-volatile storage media.

The buffer memories 14(1)~14(n) are configured to store data temporarily. For example, the buffer memories 14(1)~14(n) may include a dynamic random access memory (DRAM) or other types of volatile storage media. In addition, the number of buffer memories 14(1)~14(n) is multiple (that is, n is greater than 1).

The processor 15 is coupled to the image capturing interface 11, the display interface 12, the storage circuit 13, and the buffer memories 14(1)~14(n). The processor 15 may be responsible for the whole or part of the operation of the electronic device 10. For example, the processor 15 may include a central processing unit (CPU) or other programmable microprocessors for a common purpose or a specific purpose, a digital signal processor (DSP), a programmable controller, an application specific integrated circuit (ASIC), a programmable logic device (PLD), other similar devices, or a combination of these devices. In an embodiment, the processor 15 may also include a graphic processing unit (GPU), a vision processing unit (VPU), a neural network processing unit (NPU), or other processors dedicated to (or facilitating to) perform image processing or neural network processing.

In an embodiment, an application 101 (also referred to as a target application) may be stored in the storage circuit 13. The application 101 is configured to control the image capturing interface 11. For example, the processor 15 may perform the operations on the image capturing interface 11, such as setting a parameter, selecting an operating mode, and/or starting the image capturing interface 11 to capture the external image by the application 101. For example, the application 101 may include a camera application or other types of applications configured to control the image capturing interface 11.

In an embodiment, an image processing model 102 may further be stored in the storage circuit 13. The image processing model 102 may include a machine learning model, a deep learning model, and/or other computer computing engines. In addition, the image processing model 102 may adopt a neural network such as a deep neural network (DNN), a recurrent neural network (RNN), and/or a convolutional neural network (CNN), or various computing architectures such as an artificial neural network (ANN), which is not limited by the disclosure.

In an embodiment, the processor 15 may execute the application 101 to obtain an image (also referred to as a target image) with a specific resolution (also referred to as a first resolution) based on a certain frame rate (also referred to as a first frame rate). For example, after starting the application 101, the processor 15 may control the image capturing interface 11 by the application 101. For example, the processor 15 may instruct the image capturing interface 11 to capture (for example, photograph) the target image by the application 101 based on the first frame rate and the first resolution.

In an embodiment, the first frame rate may be 120 frames per second (FPS), and the first resolution may be 640×360. In an embodiment, the first frame rate needs to be at least 120 FPS. In an embodiment, the first frame rate may be at or close to a highest frame rate supported by the image capturing interface 11. In an embodiment, the first frame rate and first resolution may also be adjusted according to practical requirements.

In an embodiment, the processor 15 may control the image capturing interface 11 by the application 101 to operate in a specific photographing mode to capture (for example, photograph) the target image based on the first frame rate and the first resolution. For example, this specific photographing mode may include a slow motion photographing (or videoing) mode.

In an embodiment, due to the hardware limitation of the image capturing interface 11, in the specific photographing mode (for example, the slow motion photographing (or videoing) mode), the image capturing interface 11 captures the target image based on the first frame rate, so the resolution of the target image (that is, the first resolution) may not reach (or may even be much lower than) another resolution (also referred to as a second resolution) supported by the image capturing interface 11. In an embodiment, the second resolution needs to at least reach a requirement of full high definition (FHD). For example, the second resolution may be at least 1920×1080 or 2560×1440. In an embodiment, the second resolution may be at or close to the highest resolution supported by the image capturing interface 11. In an embodiment, the second resolution may also be adjusted according to practical requirements.

In an embodiment, during an execution of the application 101, the processor 15 may monitor a usage rate of each of the buffer memories 14(1)~14(n). The processor 15 may select at least one memory (also referred to as a target memory) from the buffer memories 14(1)~14(n) according to the monitored usage rate of each of the buffer memories 14(1)~14(n). For example, the usage rate of each of the buffer memory in the buffer memories 14(1)~14(n) may reflect (for example, be positively related to) the frequency with which the buffer memory is used or accessed. For example, during the execution of the application 101, if the usage rate of a certain buffer memory in the buffer memories 14(1)~14(n) is relatively high, it means that the buffer memory is more often (for example, more frequently) used or accessed than other buffer memories.

In an embodiment, the processor 15 may compare the usage rate of each of the buffer memories 14(1)~14(n) during the execution of the application 101. Then, processor 15 may select at least one buffer memory from the buffer memories 14(1)~14(n) as the target memory according to the comparison result. In an embodiment, the target memory may be the buffer memory with the highest or relatively high usage rate in the buffer memories 14(1)~14(n) during the execution of the application 101.

In an embodiment, after selecting the target memory, the processor 15 may process the target image by the image processing model 102 and the target memory to adjust (for example, increase) the resolution of the target image from the first resolution to the second resolution. In particular, the second resolution may be higher than the first resolution. For example, assuming that the first resolution is 640×360, the second resolution may be 1920×1080 or 2560×1440, and the disclosure is not limited thereto.

In an embodiment, in a process of processing the target image, the image processing model 102 may increase a resolution of each image frame in the target image by four times (or other multiples) to increase the resolution of the target image from the first resolution to the second resolution. In an embodiment, in the process of processing the target image, the image processing model 102 may further perform various image processing methods on the target image with improved resolution, such as pixel value interpolation and/or edge smoothing to improve the image quality of the target image with the improved resolution.

In an embodiment, after selecting the target memory, the processor 15 may dispose one or multiple reserved spaces in the target memory. This reserved space may be dedicated to storing data used by the image processing model 102 in the process of processing the target image. For example, the processor 15 may dispose this reserved space to be dedicated to temporarily storing various (transient) data, such as tensor, gradient, bias, and/or weighting, used, generated, and/or updated by the image processing model 102 to assist in adjusting the resolution of the target image from the first resolution to the second resolution in the process of processing the target image. Thereafter, in the process of processing the target image, the image processing model 102 may quickly write, read, and/or update the aforementioned various (transient) data by accessing the reserved space in the target memory.

In an embodiment, in the target memory, the total number of reserved spaces disposed by the processor 15 may correspond to or match the type of data used by the image processing model 102 to be stored in the process of processing the target image. For example, in an embodiment, assuming that the data used by the image processing model 102 in the process of processing the target image includes the aforementioned four types of data (that is, tensor, gradient, bias, and weighting), the total number of reserved spaces disposed in the target memory may be four. In this way, in the subsequent process of processing the target image by the image processing model 102, each reserved space in the target memory may be dedicated to storing a specific type of data corresponding to the reserved space. In addition, the total number of reserved spaces disposed in the target memory may also be increased or decreased according to practical requirements, which is not limited by the disclosure.

In an embodiment, the target memory is the buffer memory with the highest or relatively high usage rate in the buffer memories 14(1)~**14(*n*) during the execution of the application 101. Therefore, during the subsequent processing of the target image by the image processing model 102, it may be ensured as much as possible that the buffer memory accessed by the application 101 and the image processing model 102 is the same buffer memory in the buffer memories 14(1)~14(*n*), thereby reducing the occurrence of data copying of cross-buffer memory (the data copying of the cross-buffer memory may reduce the working efficiency of the image processing model 102). In this way, the processing efficiency of the image processing model 102** for the target image may be effectively improved.

In an embodiment, instead of allowing the image processing model 102 to randomly use any buffer memory during the image processing, the target memory is selected by the aforementioned method, and the reserved space is disposed in the target memory to be dedicated to accessing by the image processing model 102, which improves the work efficiency of the image processing model 102 by about 20% or even higher.

Figure 2:
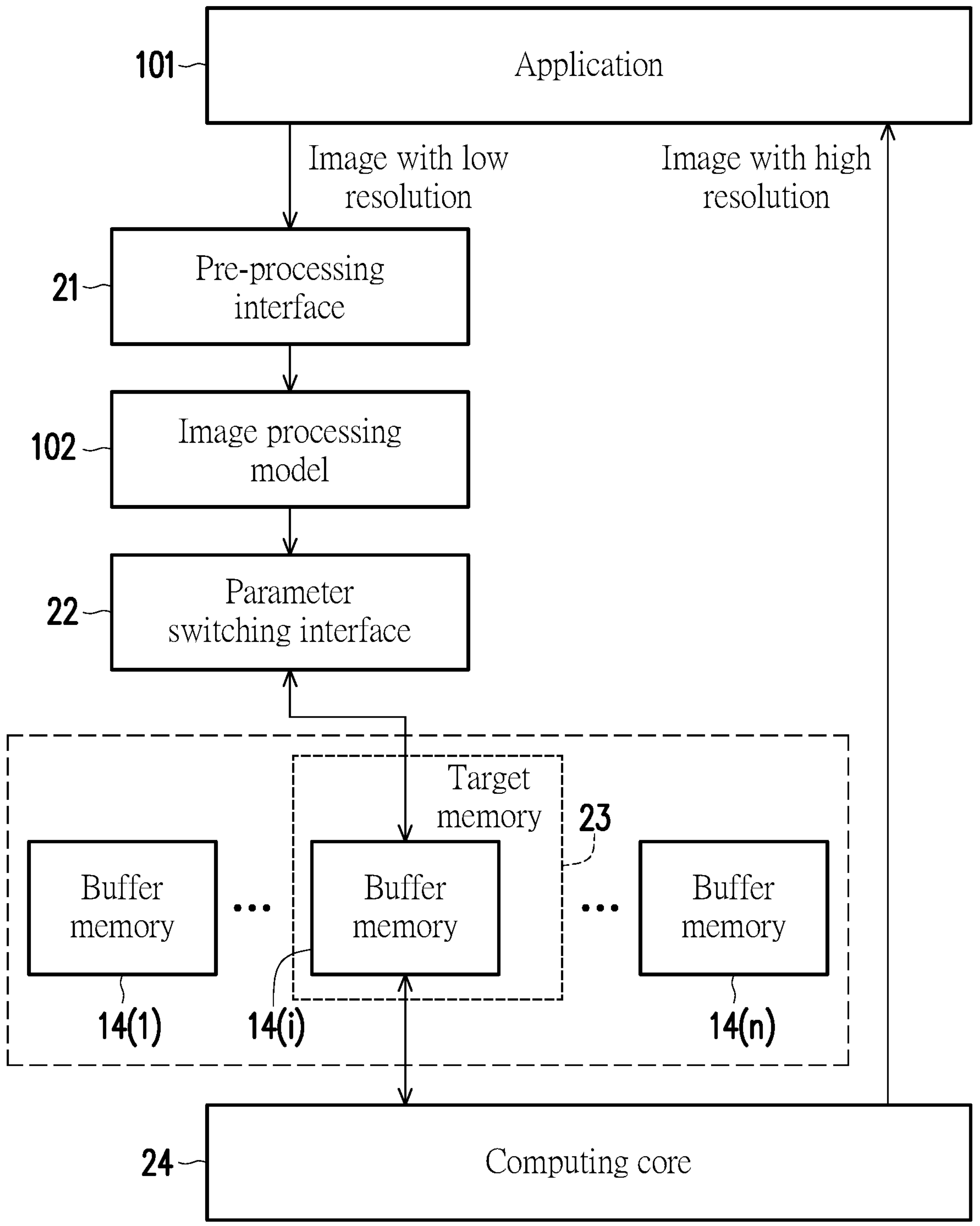
FIG. 2 is a schematic workflow diagram of an image processing model according to an embodiment of the disclosure.

FIG. 2 is a schematic workflow diagram of an image processing model according to an embodiment of the disclosure. Referring to FIG. 2, after obtaining the target image with the first resolution (that is, the image with a low resolution), the application 101 may send the target image with the first resolution to a pre-processing interface 21. The pre-processing interface 21 may be responsible for inputting the image (that is, the target image with the first resolution) to be processed and a parameter for describing an expected magnification times (such as an upscaling factor) of the target image into the image processing model 102. The image processing model 102 may match a target memory 23 and a computing core 24 to process the target image according to the received target image and the magnification times, for example, performing resolution magnification on the target image.

It should be noted that in the embodiment of FIG. 2, a buffer memory **14(*i*) may be set as the target memory 23. For example, the buffer memory 14(*i*) may be the buffer memory with the highest or relatively high usage rate in the buffer memories 14(1)~14(*n*) during the execution of the application 101. Thereafter, in the process of processing the target image, the image processing model 102 may access the target memory 23 by a parameter switching interface 22 to update various data used by the image processing model 102** in the process of processing the target image.

On the other hand, in the process of processing the target image, a hardware device (such as GPU, VPU, and/or NPU) where the computing core 24 is located may also access the target memory 23 to assist the image processing model 102 in performing the relevant neural network computing (such as parameter updating), thereby generating the target image with the second resolution (that is, the image with a high resolution). After generating the target image with the second resolution, the computing core 24 may return the target image with the second resolution to the application 101.

In an embodiment, instead of arbitrarily using the buffer memories 14(1)~**14(*n*) to temporarily store data in the process of processing the target image, the buffer memory 14(*i*) is disposed as the target memory 23, which may effectively improve the processing efficiency of the image processing model 102 (and the computing core 24**) on the target image.

In an embodiment, assuming that the hardware limitation of the image capturing interface 11 is limited, the target image with the relatively low resolution (such as 640×360) is only captured in the slow motion photographing (or videoing) mode provided by the application 101 based on a relatively high frame rate (such as 120 FPS). After a very fast procedure of resolution magnification (as shown in FIG. 2), the resolution of this target image may be greatly increased (for example, increased to 1920×1080 or 2560×1440) without changing the frame rate of the target image.

Returning to FIG. 1, in an embodiment, after generating the target image with the second resolution, the processor 15 may control the display interface 12 to present the target image with the second resolution based on the first frame rate. For example, in the slow motion playing mode provided by the application 101, the processor 15 may control the display interface 12 to present the target image with the second resolution based on the first frame rate.

In an embodiment, compared to the hardware limitation of the image capturing interface 11 traditionally limited and the image with the low resolution (such as the image with the resolution of 640×360) only presented in the slow motion videoing and playing mode based on the relatively high frame rate (such as 120 FPS), in the embodiments of the disclosure, in the slow motion playing mode, the display interface 12 may still present the image with the high resolution (such as the image with the resolution of 1920×1080 or 2560×1440) based on the aforementioned relatively high frame rate (such as 120 FPS), thereby effectively improving an experience of the user.

Figure 3:
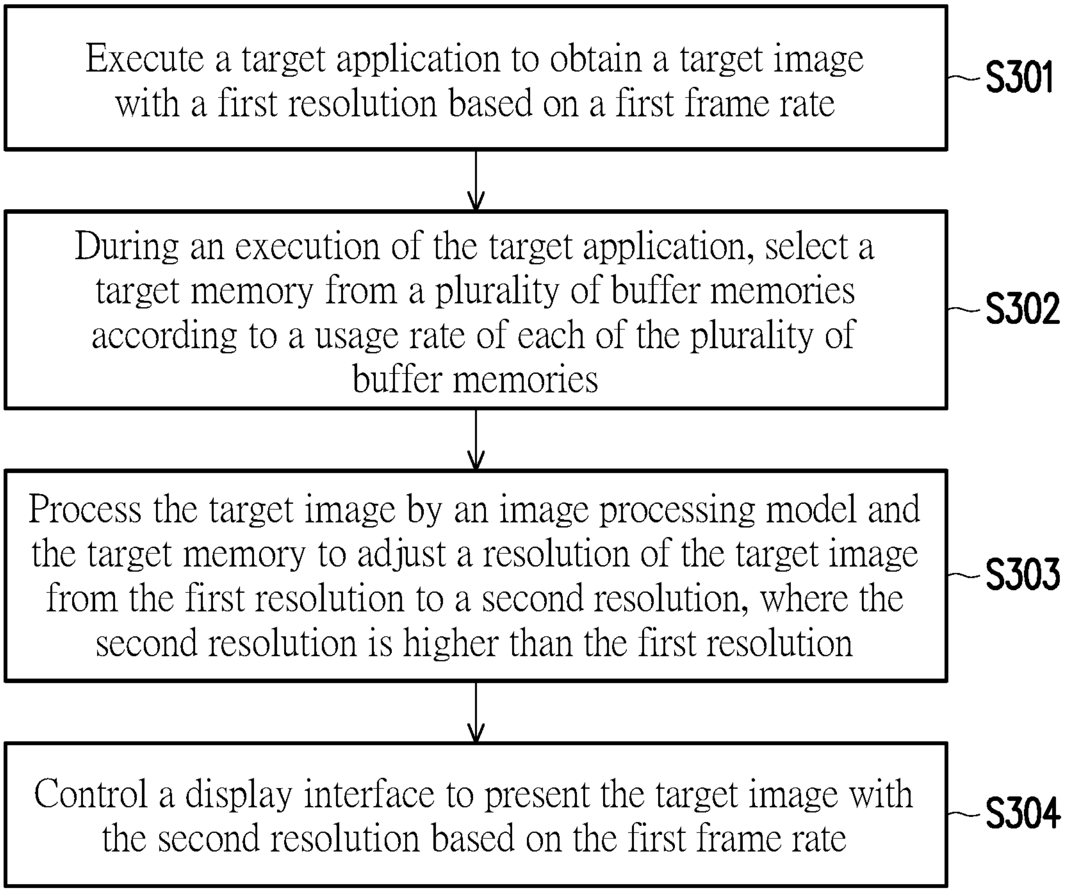
FIG. 3 is a flowchart of an image resolution adjustment method according to an embodiment of the disclosure.

FIG. 3 is a flowchart of an image resolution adjustment method according to an embodiment of the disclosure. Referring to FIG. 3, in step S301, the target application is executed to obtain the target image with the first resolution based on the first frame rate. In step S302, during the execution of the target application, the target memory is selected from multiple buffer memories according to the usage rate of each of the buffer memories. In step S303, the target image is processed by the image processing model and the target memory to adjust the resolution of the target image from the first resolution to the second resolution, where the second resolution is higher than the first resolution. In step S304, the display interface is controlled to present the target image with the second resolution based on the first frame rate.

However, each step in FIG. 3 has been described in detail above and is not repeated here. It is worth noting that each step in FIG. 3 may be implemented as multiple program codes or circuits, which is not limited by the disclosure. In addition, the method in FIG. 3 may be used in conjunction with the aforementioned exemplary embodiments or may be used alone, which is not limited by the disclosure.

In summary, the image resolution adjustment method and the electronic device provided by the embodiments of the disclosure may break through the hardware limitations of the image capturing interface. In the specific photographing mode (such as the slow motion videoing mode), the image resolution adjustment method and the electronic device may quickly improve the resolution of the captured target image with the low resolution based on a high frame rate, and the target image with increased resolution may be played (for example, played in the slow motion) in real time based on the high frame rate, thereby effectively improving the experience of the user.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the appended claims.

What is claimed is:

1. An image resolution adjustment method, comprising:

executing a target application to obtain a target image with a first resolution based on a first frame rate;

during an execution of the target application, selecting a target memory from a plurality of buffer memories according to a usage rate of each of the plurality of buffer memories and disposing a reserved space in the target memory;

processing the target image by an image processing model and the target memory to adjust a resolution of the target image from the first resolution to a second resolution, wherein the second resolution is higher than the first resolution, and the reserved space is dedicated to storing data used by the image processing model to perform the processing of the target image, such that the target application and the image processing model both access the same target memory selected according to the usage rate of the plurality of buffer memories, thereby reducing an occurrence of copying of data used by the image processing model among the plurality of buffer memories; and controlling a display interface to present the target image with the second resolution based on the first frame rate.

2. The image resolution adjustment method according to claim 1, wherein during the execution of the target application, the step of selecting the target memory from the plurality of buffer memories according to the usage rate of each of the plurality of buffer memories comprises:

comparing the usage rate of each of the plurality of buffer memories during the execution of the target application; and selecting the target memory from the plurality of buffer memories according to a comparison result.

3. The image resolution adjustment method according to claim 1, wherein the target memory is a buffer memory with a highest usage rate in the plurality of buffer memories during the execution of the target application.

4. The image resolution adjustment method according to claim 1, wherein the step of controlling the display interface to present the target image with the second resolution based on the first frame rate comprises:

in a slow motion playing mode, controlling the display interface to present the target image with the second resolution based on the first frame rate.

5. The image resolution adjustment method according to claim 1, wherein the first frame rate reaches at least 120 frames per second, and the second resolution is at least 1920×1080 pixels for one image.

6. An electronic device, comprising:

an image capturing interface;

a display interface;

a plurality of buffer memories; and a processor, coupled to the image capturing interface, the display interface, and the plurality of buffer memories, wherein the processor is configured to:

execute a target application to instruct the image capturing interface to obtain a target image with a first resolution based on a first frame rate;

select a target memory from the plurality of buffer memories according to a usage rate of each of the plurality of buffer memories during an execution of the target application and dispose a reserved space in the target memory;

process the target image by an image processing model and the target memory to adjust a resolution of the target image from the first resolution to a second resolution, wherein the second resolution is higher than the first resolution, and the reserved space is dedicated to storing data used by the image processing model to perform the processing of the target image, such that the target application and the image processing model both access the same target memory selected according to the usage rate of the plurality of buffer memories, thereby reducing an occurrence of copying of data used by the image processing model among the plurality of buffer memories; and control the display interface to present the target image with the second resolution based on the first frame rate.

7. The electronic device according to claim 6, wherein the operation in which the processor selects the target memory from the plurality of buffer memories according to the usage rate of each of the plurality of buffer memories during the execution of the target application comprises:

comparing the usage rate of each of the plurality of buffer memories during the execution of the target application; and selecting the target memory from the plurality of buffer memories according to a comparison result.

8. The electronic device according to claim 6, wherein the target memory is a buffer memory with a highest usage rate in the plurality of buffer memories during the execution of the target application.

9. The electronic device according to claim 6, wherein the operation in which the processor controls the display interface to present the target image with the second resolution based on the first frame rate comprises:

in a slow motion playing mode, controlling the display interface to present the target image with the second resolution based on the first frame rate.

10. The electronic device according to claim 6, wherein the first frame rate reaches at least 120 frames per second, and the second resolution is at least 1920×1080 pixels for one image.

* * * * *